United States Patent
Isaksson et al.

(10) Patent No.: US 11,603,475 B2
(45) Date of Patent: Mar. 14, 2023

(54) ANTIFOULING ARTICLE

(71) Applicant: I-Tech AB, Mölndal (SE)

(72) Inventors: Dan Isaksson, Mölndal (SE); Henric Götvall, Mariestad (SE)

(73) Assignee: I-Tech AB, Molndal (SE)

( * ) Notice: Subject to any disclaimer, the term of this patent is extended or adjusted under 35 U.S.C. 154(b) by 764 days.

(21) Appl. No.: 16/497,213

(22) PCT Filed: Mar. 29, 2018

(86) PCT No.: PCT/SE2018/050347
§ 371 (c)(1),
(2) Date: Sep. 24, 2019

(87) PCT Pub. No.: WO2018/182499
PCT Pub. Date: Oct. 4, 2018

(65) Prior Publication Data
US 2020/0048477 A1 Feb. 13, 2020

(30) Foreign Application Priority Data
Mar. 29, 2017 (SE) .................. 1750367-3

(51) Int. Cl.
| C09D 5/16 | (2006.01) |
| B05D 1/02 | (2006.01) |
| B05D 3/10 | (2006.01) |
| C08G 18/76 | (2006.01) |
| C08K 5/3445 | (2006.01) |
| C09D 175/04 | (2006.01) |

(52) U.S. Cl.
CPC ............ *C09D 5/1625* (2013.01); *B05D 1/02* (2013.01); *B05D 3/108* (2013.01); *C08G 18/7671* (2013.01); *C08K 5/3445* (2013.01); *C09D 175/04* (2013.01); *B05D 2503/00* (2013.01)

(58) Field of Classification Search
CPC ...... C09D 5/1625; C09D 175/04; B05D 1/02; B05D 3/108; B05D 2503/00; C08G 18/7671; C08K 5/3445
See application file for complete search history.

(56) References Cited

U.S. PATENT DOCUMENTS

| 3,702,778 A | 11/1972 | Mueller et al. |
| 2006/0201379 A1 | 9/2006 | Nyden et al. |
| 2012/0015017 A1 | 1/2012 | Nyden et al. |

(Continued)

FOREIGN PATENT DOCUMENTS

| EP | 0072615 | 2/1983 |
| GB | 1307001 | 2/1973 |
| WO | 2007007901 | 1/2007 |

(Continued)

OTHER PUBLICATIONS

International Search Report and the Written Opinion of the International Searching Authority corresponding to International Patent Application No. PCT/SE2018/050347 (10 pages) (dated Jun. 6, 2018).

(Continued)

*Primary Examiner* — Robert S Walters, Jr.
(74) *Attorney, Agent, or Firm* — Myers Bigel, P.A.

(57) ABSTRACT

The present embodiments relate to an antifouling article comprising polyurethane and medetomidine, or an enantiomer or salt thereof, from 0.1% by weight of the antifouling article and present in a polymer matrix of the polyurethane.

20 Claims, 3 Drawing Sheets

(56) References Cited

U.S. PATENT DOCUMENTS

2014/0141263 A1    5/2014   Jones et al.
2014/0247690 A1    9/2014   Macquin et al.

FOREIGN PATENT DOCUMENTS

| WO | 2010133548 | 11/2010 |
| WO | 2011070069 | 6/2011 |
| WO | 2012150360 | 11/2012 |

OTHER PUBLICATIONS

ATSM Designation D 5618—94 "Standard Test Method for Measurement of Barnacle Adhesion Strength in Shear" (2 pages) (2005).
Lewthwaite et al. "An Investigation into the Variation of Ship Skin Fictional Resistance with Fouling" Annual Report and Transactions of the Royal Institution of Naval Architects, 127:269-284 (1985) (Abstract only).
MacDonald et al. "Comparison of the behavioral and neurochemical effects of the two optical enantiomers of medetomidine, a selective alpha-2-adrenoceptor agonist" The Journal of Pharmacology and Experimental Therapeutics, 259(2):848-854 (1991).
Savola et al. "Central alpha 2-adrenoceptors are highly stereoselective for dexmedetomidine, the dextro enantiomer of medetomidine" European Journal of Pharmacology, 195(2):193-199 (1991).
Swain, Gregory "Redefining Antifouling Coatings" Journal of Protective Coatings and Linings, pp. 26-35 (1999).

ANTIFOULING ARTICLE

TECHNICAL FIELD

The present embodiments generally relate to antifouling articles, and to methods and kits for producing such antifouling articles.

BACKGROUND

Biofouling presents several issues for underwater structures. Accordingly, there is a general need to prevent and reduce biofouling. There are numerous antifouling approaches currently employed, including the use of specific coatings that deter biofouling, the use of toxins or biocides having antifouling activity as additives in coatings or paints for surfaces, and the use of mechanical cleaning of surfaces.

There are both economic and environmental benefits of reducing biofouling on marine and freshwater installations. For example, biofouling reduces fuel efficiency for ships, reduces profitable operation time of ships during the biofouling cleaning procedures and decreases cooling power of cooling water equipment, to mention a few.

Certain coatings present surfaces that physically deter organisms so that they cannot easily adhere to the surface. These types of coatings are generally hydrophobic, smooth, slippery and have low friction, such as elastomers, including silicone rubbers [1-3]. Such coating are typically referred to as foul-release coatings rather than antifouling coatings. The foul-release coatings are characterized in a barnacle adhesion measurement, for example using ASTM D 5618-94 [4]. A foul-release coating usually has a mean barnacle adhesion value of less than 0.4 MPa. Mean barnacle adhesion values for some common material are 0.05 MPa for silicone surfaces, 0.85 MPa for polypropylene surfaces, 0.96 MPa for polycarbonate surfaces, 1.52 MPa for epoxy surfaces and 1.53 MPa for urethane surfaces [5]. Thus, of the surfaces tested in [5], silicone had the best foul-release characteristics, whereas urethane had the poorest foul-release characteristics. A similar result is presented in [6], which discloses that polyurethanes have extremely high barnacle adhesion strength as compared to surfaces of silicones.

In the art, self-polishing coating systems have had a wide use and in the 1970's tributylin-based self-polishing copolymer was successfully introduced. Self-polishing coatings (SPCs) slowly degrade over time so that the attached organisms will be shed or fall off the coated surface. The degradation is often caused by a slow, controlled hydrolysis of a component in the coating, usually a binder component. Concerns about the toxicity of tributylin-based self-polishing copolymer have prompted the development of safer alternatives and there are today a number of available choices for specific self-polishing coating systems.

Toxins or biocides are also widely employed. The toxins or biocides can cause a physiological disruption or disturbance of the organism, or result in killing the organism. The toxic or biocidal effects may occur prior to, during or after adhesion of the organism, with the final outcome that the organism falls off the coated surface. A number of different substances are employed for this purpose depending on the organism to deter from fouling surfaces.

Furthermore, coating systems usually contain a number of components apart from the added toxins or biocides, such as resins; plasticisers to modify the mechanical properties of the coating system; and pigments. All of these components can be tweaked in the composition of the coating system to achieve a blend in the final coating system that has the specific properties that are desired.

A protective removable skin section for seismic survey system is known in the art [7]. The protective removable skin section includes a flexible sheet and a reversible closure system configured to join edges of the flexible sheet.

An antifouling thermoplastic polyurethane (TPU) composition comprising a thermoplastic polyurethane and an organometallic antifouling additive is known in the art [13]. The TPU composition has a surface energy of 18-26 mJ/m$^2$.

There are, however, a need for antifouling articles that, in addition to antifouling characteristics, have desired properties for usage in underwater or submersible installations and equipment.

SUMMARY

It is a general objective to provide an antifouling article, and a method and kit for producing such an antifouling article.

It is a particular objective to provide an antifouling article having properties suitable for usage in underwater or submersible installations and equipment.

These and other objectives are met by embodiments as disclosed herein.

An aspect of the embodiments relates to an antifouling article comprising polyurethane and medetomidine, or an enantiomer or salt thereof, from 0.1% by weight of the antifouling article and present in a polymer matrix of the polyurethane.

Another aspect of the embodiments relates to a method of producing an antifouling article. The method comprises mixing medetomidine, or an enantiomer or salt thereof, and a solvent to form a medetomidine solution. The medetomidine solution is reacted with at least one isocyanate comprising at least two isocyanate groups per molecule and at least one polyol to form polyurethane. The medetomidine, or the enantiomer or salt thereof, is present in a polymer matrix of the polyurethane. The method also comprises forming the polyurethane into the antifouling article. The medetomidine, or the enantiomer or salt thereof, is present in at least 0.1% by weight of the antifouling article.

A further aspect of the embodiments relates to a kit for producing an antifouling article. The kit consists of at least one polyol, at least one isocyanate comprising at least two isocyanate groups per molecule, a solvent, medetomidine, or an enantiomer or salt thereof, in an amount sufficient to achieve a concentration of medetomidine, or the enantiomer or salt thereof, of at least 0.1% by weight of the antifouling agent, optionally a catalyst, optionally at least one chain extender and/or cross linker, optionally at least one drying agent, optionally at least one biocide other than medetomidine, or the enantiomer or salt thereof, and optionally at least controlled-release agent.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
FIG. 1 illustrate polyurethane panels comprising 0% (left), 0.1% (middle) and 1.0% (right) medetomidine by weight after 15 months of submersion underwater. No barnacles are found on the polyurethane panels with medetomidine, whereas there are plenty of barnacles on the control polyurethane panel without any medetomidine.
Figure 1:
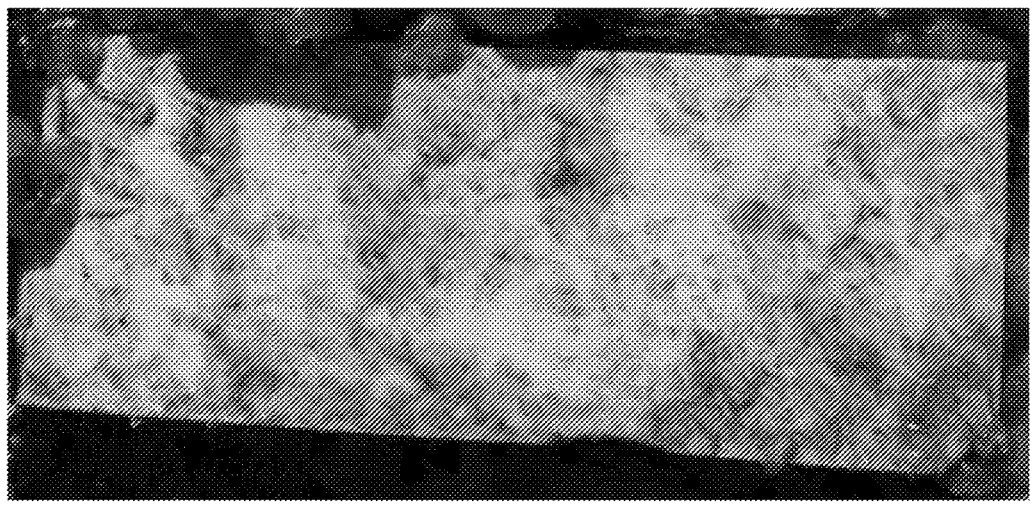
Figure 1:

The foregoing and other aspects of the embodiments will now be described in more detail with respect to the description and methodologies provided herein. It should be appreciated that the invention may be embodied in different forms and should not be construed as limited to the embodiments set forth herein. Rather, these embodiments are provided so that this disclosure will be thorough and complete, and will fully convey the scope of the invention to one of ordinary skill in the art.

The one of ordinary skill in the art will understand that terminology used in the description herein is for the purpose of describing particular embodiments only and is not intended to be limiting of the invention. Unless otherwise defined, all terms, including technical and scientific terms used in the description, have the same meaning as commonly understood by one of ordinary skill in the art to which this invention belongs.

As used in the description of the embodiments, the singular forms "a," "an" and "the" are intended to include the plural forms as well, unless the context clearly indicates otherwise. Thus, such references may be replaced with a reference to "one or more", e.g., one, of the relevant component or integer. As used herein, all references to "one or more" of a particular component or integer will be understood to refer to from one to a plurality, e.g., two, three or four, of such components or integers. It will be understood that references to "one or more" of a particular component or integer will include a particular reference to one such integer. Also, as used herein, "and/or" refers to and encompasses any and all possible combinations of one or more of the associated listed items. Furthermore, the term "about," as used herein when referring to a measurable value, such as an amount of a compound, dose, time, temperature, and the like, refers to variations of 20%, 10%, 5%, 1%, 0.5%, or even 0.1% of the specified amount. When a range is employed, e.g., a range from x to y, it is it meant that the measurable value is a range from about x to about y, or any range or value therein including x and y. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof.

"Effective amount" as used herein refers to an amount of a compound, composition and/or formulation that is sufficient to produce a desired effect.

All patents, patent applications and publications referred to herein are incorporated by reference in their entirety. In the event of conflicting terminology, the present specification is controlling.

The present embodiments generally relate to antifouling articles or products, and to methods and kits for producing such antifouling articles or products.

The antifouling articles of the embodiments are based on the use of polyurethane. More specifically, the present embodiments relate to antifouling articles made of polyurethane and comprising a biocide present in a polymer matrix of the polyurethane, thereby achieving an efficient antifouling article.

It was highly surprising that polyurethane articles would be suitable for manufacture of antifouling articles given its very poor barnacle adhesion value of above 1.5 MPa, whereas efficient antifouling material should have a barnacle adhesion value below 0.4 MPa [5]. A similar finding was presented in [6], in which polyurethane had the poorest antifouling characteristic among eleven tested materials. Document [6] thereby concluded that the only alternatives to fluorinated compounds identified as having antifouling characteristics are silicones.

Experimental data as presented herein, however, shows that articles and products according to the embodiments have excellent antifouling properties, efficiently preventing adhesion and growth of barnacles onto the surfaces of the articles even if submersed underwater for very long period of time, i.e., at least 15 months. Thus, the antifouling articles of the embodiments not only prevent or at least significantly reduce or inhibit adhesion and growth of barnacles on the antifouling articles but this antifouling property of the embodiments is stable and effective during long periods of time.

Polyurethane has several properties that make it useful for manufacturing articles to be present underwater, or coatings or paints for such underwater or submersible articles. These properties include, among other, high impact resistance. This means that a submersible article made of polyurethane according to the embodiments or having a polyurethane coating of the embodiments will be capable of resisting impacts and high forces without breaking. Another advantageous property of polyurethane is high load bearing capacity. This means that polyurethane of the embodiments can be used to manufacture submersible articles that may be exposed to high loads, without breaking or shear failure. Further advantages of polyurethane include low weight (low density); electrically non-conductive; cut, tear and abrasion resistant; corrosion resistant; oil resistant; ozone and radiation resistant; and hydrolysis resistant. These properties are all beneficial for various underwater or submersible installations, devices and equipment. Polyurethane can also be made flexible and has elastic memory, which may be useful in some underwater or submersible applications.

The present embodiments are based on the usage of medetomidine, or an enantiomer or salt thereof, as biocide present in the polymer matrix of the polyurethane.

Medetomidine, also referred to as (±)-4,5-[1-(2,3-dimethylphenyl)ethyl)-1H-imidazole, see formula I, is a highly selective α2-adrenoreceptor agonist.

(I)

Medetomidine is a highly efficient inhibitor of barnacles and impede larval settlement already at low concentrations, 1-10 nM. Medetomidine interacts with octopamine receptors in the barnacle cyprid larva, causing the legs of the larva to kick and thereby prevents the larva from settling onto medetomine containing or releasing surface. Medetomidine has also shown effect on other hard fouling, such as tube worms.

Medetomidine, first described in [8], is a racemic mixture of the two optical enantiomers, the levo- and dextro-rotary optical isomers [9,10] with generic names levomedetomidine and dexmedetomidine, respectively. A process for the preparation of the racemic mixture of medetomidine and related intermediates is disclosed in [11]. Many of the previous medetomidine synthesis used expensive 4-substituted imidazole derivatives as starting material. However, the synthesis presented in [11] is made from affordable commercially available starting materials, where the imidazole ring is instead formed during the synthesis.

The terms medetomidine, dexmedetomidine, and levomedetomidine as used herein include salts and solvates thereof unless specifically stated otherwise. Acceptable salts of medetomidine, dexmedetomidine, and levomedetomidine include acid addition salts and base addition salts. Such salts may be formed by conventional means, for example by reaction of a free acid or a free base form of medetomidine, dexmedetomidine, and levomedetomidine with one or more equivalents of an appropriate acid or base, optionally in a solvent, or in a medium in which the salt is insoluble, followed by removal of the solvent, or the medium, using standard techniques, e.g., in vacuum or by freeze-drying. Salts may also be prepared by exchanging a counter-ion of medetomidine, dexmedetomidine, and levomedetomidine in the form of a salt with another counter-ion, for example using a suitable ion exchange resin. For the avoidance of doubt, other acceptable derivatives of medetomidine, dexmedetomidine, and levomedetomidine are included within the scope of the invention, e.g., solvates, prodrugs, etc.

The enantiomers of medetomidine may be isolated and separated from each other by separation of racemic or other mixtures of the enantiomers using chiral resolution or chiral column chromatography known in the art. Alternatively the desired enantiomer may be prepared by enantio-selective synthesis, also called chiral synthesis or asymmetric synthesis, which is defined as a chemical reaction, or reaction sequence, in which one or more new elements of chirality are formed in a substrate molecule and which produces the stereoisomeric products in unequal amounts.

Medetomidine is distributed by the company I-Tech AB under the product name SELEKTOPE®.

In the following, various aspects and embodiments of the present invention are described in further detail with reference to medetomidine. These aspects and embodiments also encompass an enantiomer of medetomidine, such as dexmedetomidine or levomedetomidine, or a salt of medeotomidine, a salt of dexmedomidine, or a salt of levomedetomidine, collectively denoted medetomidine, or an enantionmer or salt thereof herein. Thus, reference to medetomidine herein should be regarded as relating to medetomidine, a salt of medeotomidine, dexmedetomidine, a salt of dexmedetomidine, levomedetomidine and/or a salt of levomedetomidine, unless indicated otherwise.

An aspect of the embodiments relates to an antifouling article comprising polyurethane and medetomidine, or an enantiomer or salt thereof, from 0.1% by weight of the antifouling article and present in a polymer matrix of the polyurethane.

Experimental data as presented herein show that antifouling articles made of polyurethane and comprising at least 0.1% by weight of medetomidine present in the polymer matrix have excellent antifouling characteristics and effi-ciently prevent settlement of barnacles and other hard fouling onto the surface of the antifouling articles.

The medetomidine, or the enantiomer or salt thereof, is present in the polymer matrix of the polyurethane in the antifouling article. The medetomidine, or the enantiomer or salt thereof, slowly leaks out from the polymer matrix to thereby become available at the surface and/or in the vicinity of the antifouling article. There the medetomidine, or the enantiomer or salt thereof, can exert its antifouling property to thereby prevent or at least significantly reduce adhesion and growth of barnacles onto the surface of the antifouling article.

This is in clear contrast to [13], in which the TPU composition is formed by first producing the TPU and then compounding the TPU and an antifouling additive. The resulting TPU compositions in [13] have poor antifouling properties with barnacle growth even after one month. More importantly, any antifouling effect of the TPU composition in [13] rapidly deteriorated resulting in TPU articles almost fully covered by barnacles after a few months.

It therefore seems that producing the antifouling article according to the present embodiments to form the antifouling additive medetomidine, or the enantiomer or salt thereof, in the polymer matrix of the polyurethane is important in order to achieve an antifouling article with excellent and long lasting antifouling effects.

In an embodiment, the antifouling article is obtainable by mixing medetomidine and a solvent to form a medetomidine solution. The medetomidine solution is reacted with at least one isocyanate comprising at least two isocyanate groups per molecule and at least one polyol to form polyurethane. The medetomidine is present in the polymer matrix. The polyurethane is formed into the antifouling article. According to the embodiments, the medetomidine is present in at least 0.1% by weight of the antifouling article.

The solvent is capable is capable of dissolving medetomidine to form the medetomidine solution. The solvent is preferably also compatible with the other ingredients or constituents used to form polyurethane comprising medetomidine in the polymer matrix, e.g., the at least one isocyanate and the at least one polyol.

In an embodiment, the solvent is selected from a group consisting of a diol; a polyol, such as a triol; a diamine; a polyamine, such as a triamine; and a mixture thereof.

Non-limiting examples of such solvents include ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis(2-hydroxyethyl)ether (HQEE), ethanolamine, diethanolamine, methyldiethanolamine, phenyldiethanolamine, diethyltoluenediamine, dimethylthiotoluenediamine, glycerol, trimethylolpropane, 1,2,6-hexanetriol, triethanolamine, pentaerythritol and N,N,N',N'-tetrakis(2-hydroxypropyl)ethylenediamine.

In a particular embodiment, the solvent is selected from a group consisting of a diol; a diamine; and a mixture thereof.

In another particular embodiment, the solvent is a diol, preferably 1,4-butanediol.

In a particular embodiment, the solvent participates in the polymerization reaction forming polyurethane polymers and the polymer matrix. For instance, the solvent could be a so-called chain extender, a cross-linker or a mixture of at least one chain extender and at least one cross-linker in the polymerization reaction.

Hence, in an embodiment the solvent is used as a chain extender and/or a cross-linker in reacting the medetomidine solution with the at least one isocyanate and the at least one polyol.

Thus, in an embodiment, medetomidine is preferably first dissolved in the solvent, such as 1,4-butanediol, to form the medetomidine solution. In an embodiment, the medetomidine solution comprises medetomidine, or the enantiomer or salt thereof, from 0.1 up to 20% by weight of the medetomidine solution, preferably 5 up to 20% by weight of the medetomidine solution, and more preferably 10 up to 20% by weight of the medetomidine solution.

The medetomidine solution is then reacted with at least one isocyanate and at least one polyol in a polymerization reaction to form the polyurethane as shown in the generalized reaction scheme below, wherein $R^1$ and $R^2$ defines the particular isocyanate and polyol, respectively,

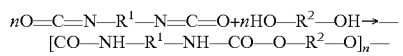

$$nO{=}C{=}N{-}R^1{-}N{=}C{=}O + nHO{-}R^2{-}OH \rightarrow [CO{-}NH{-}R^1{-}NH{-}CO{-}O{-}R^2{-}O]_n{-}$$

The isocyanate comprises at least two isocyante groups per molecule. In an embodiment, the isocyanate is a diisocyanate, i.e., has exactly two isocyanate groups per molecule. The embodiments are, however, not limited thereto and may also involve using triisocyantes, tetraisocyanates, isocyanates with five or more isocyanate groups per molecule, or mixtures of at least two of diisocyanates, triisocyanates, tetraisocyanates and isocyanates with five or more isocyante groups per molecule. An example of such an isocyanate is polymeric diphenylmethane diisocyanate, which is a mixture of molecules with two, three, and four or more isocyanate groups, and thereby having an average isocyanate group number per molecule larger than two, such as 2.7.

The isocyanate can be selected from aromatic isocyanates, such as diphenyl diisocyanate (MDI), toluene diisocyanate (TDI), or a mixture thereof; aliphatic isocyanates, such as hexamethylene diisocyanate (HDI), isophorone diisocyanate (IPDI), or a mixture thereof; or a mixture of at least one aromatic isocyanate and at least one aliphatic isocyanate. In a particular embodiment, the isocyanate is MDI.

Polyols are the other major part of the polyurethane reaction. In an embodiment, the polyol has a comparatively high molecular weight, such as from about 400 to about 7000 Da. They are typically long and flexible molecules, often referred to as backbone of an elastomeric molecule.

In a particular embodiment, polyether polyols are used in the polyurethane reaction. Non-limiting examples of such polyether polyols include polypropylene glycols, polyethylene glycol, poly(tetramethylene ether) glycol, and mixtures thereof.

In another particular embodiment, the polyol is a polyester polyol. Polyester polyols are often based on an adipic acid and are often more complex than polyether polyols. They give excellent mechanical properties but are sensitive to degradation due to hydrolysis. An example of a polyester polyol is hydroxyl-terminated polybutadiene (HTPB).

Other polyols that can be used include polycarbonate polyols, polycaprolactone polyols, polybutadiene polyols and polysulfide polyols.

In a further particular embodiment, a mixture of at least two polyols is used, such as a mixture of at least two polyether polyols, a mixture of at least two polyester polyols, a mixture of at least two polycarbonate polyols, a mixture of at least two polycaprolactone polyols, a mixture of at least two polybutadiene polyols, a mixture of at least two polysulfide polyols, or a mixture of at least one polyol selected from the group consisting of a polyether polyol, a polyester polyol, a polycarbonate polyol, a polycaprolactone polyol, a polybutadiene polyol, and a polysulfide polyol and at least one other polyol selected from this group.

In a particular embodiment, the polyol is a polyether polyol, or a mixture of polyether polyols, a polyester polyol, or a mixture of polyester polyols, or a mixture of at least one polyether polyol and at least one polyester polyol.

In an embodiment, the medetomidine solution is reacted with the at least one isocyanate and the at least one polyol in the presence of a catalyst and/or by activation with ultraviolet light. Non-limiting examples of catalysts that can be used include tertiary amines, such as 1,4-diazobicyclo[2.2.2]octane, also referred to as DABCO, triethylenediamine (TEDA), N,N-dimethylethanolamine (DMEA), 1,3,5-tris(3-[dimethylamino]propyl)-hexahydro-s-triazine, N,N,N',N'',N''-pentamethyldiethylenetriamine, N,N-dimethylcyclohexylamine (DMCHA), N,N-dimethylaminoethoxyethanol, 2,2'-dimorpholinodiethylether, N,N'-dimethylpiperazine, or bis-(2-dimethylaminoethyl)ether, and metallic compounds, such as potassium acetate, potassium octoate, stannous octoate, stannous neodecanoate, dibutyltin dilaurate or bismuth octanoate.

Thus, in an embodiment the reaction comprises reacting the medetomidine solution with the at least one isocyanate and the at least one polyol in the presence of a catalyst and/or by activation of ultraviolet light.

In an embodiment, at least one chain extender (f=2) and/or at least one cross linker (f 3) could be added in the reaction to affect the polymer morphology of the polyurethane polymers. Such chain extenders and cross linkers are low molecular weight hydroxyl and amine terminated compounds. Non-limiting examples include difunctional (f=2) hydroxyl compounds, such as ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, HQEE, ethanolamine, diethanolamine, methyldiethanolamine, and phenyldiethanolamine; difunctional (f=2) amine compounds, such as diethyltoluenediamine and dimethylthiotoluenediamine; trifunctional (f=3) hydroxyl compounds, such as glycerol, trimethylolpropane, 1,2,6-hexanetriol and triethanolamine; and tetrafunctional (f=4) hydroxyl compounds, such as pentaerythritol and N,N,N',N'-tetrakis(2-hydroxypropyl)ethylenediamine.

In an embodiment, at least one drying agent is used to scavenge moisture during the polymerization reaction. Generally, polyols are prone to absorb water. This water or moisture may then react with the at least one isocyanate to produce, among others, carbon dioxide. The carbon dioxide may cause bubbles to appear in the antifouling article, which may weaken the polymer matrix.

The at least one drying agent could be any drying agent traditionally used in connection with polyurethane polymerization and reaction. In a particular embodiment, the at least one drying agent is a zeolite, or a mixture of zeolites. Non-limiting, but illustrative, examples of zeolites that can be used include zeolite 3A, 4A, 5A and 10A. Other examples of drying agents include silanes, such as vinyl silane, e.g., DYNASLAN® VTMO, tetra-alkyl orthosilicates, such as tetraethyl orthosilicate, and metal sulphates.

Thus, in an embodiment the reaction comprises reacting the medetomidine solution with the at least one isocyanate, the at least one polyol, optionally at least one chain extender and/or at least one cross linker, optionally at least one drying agent and optionally in the presence of a catalyst and/or by activation of ultraviolet light.

In an embodiment, the antifouling article comprises medetomidine from 0.1 up to 2% by weight, preferably from 0.1 up to 1.5% by weight of the antifouling article, and more preferably 0.1 up to 1% by weight.

In an embodiment, the antifouling article consists of polyurethane having the polyurethane polymer matrix, medetomidine from 0.1% by weight of the antifouling article and present in the polymer matrix, optionally at least one pigment, optionally at least one biocide other than medetomidine, and optionally at least one controlled-release agent.

Thus, in an embodiment the antifouling article consists substantially of polyurethane and medetomidine and optionally one or more pigments, optionally one or more biocides and/or optionally at least one agent controlling the release of the active agent(s) in the antifouling article. This means that the antifouling agent is made of very few components. This is a significant advantage of this embodiment as compared to prior art antifouling compositions, often comprising a complex and thereby expensive mixture of compounds to form an antifouling article.

The optional controlled-release agent could include nanoparticles providing a large specific surface area, i.e., high ratio of surface area vs. particle volume, onto which one or more active agents can be adsorbed. Such a controlled-release agent can be used to control the release of any active agents adsorbed onto the nanoparticles in order to achieve a desired release rate or duration of the adsorbed active agents. Thus, active agents, such as medetomidine, adsorbed or otherwise bound to such nanoparticles have excellent dispersion stability. Non-limiting, but illustrative examples of nanoparticles that could be used as controlled-release agents include copper(II) oxide, cuprous(I) oxide, titanium(II) oxide and zinc(II) oxide formulated into nanoparticle sizes, see [12].

Other examples of controlled-release agents include polymers, such as degradable polymers that release medetomidine and/or other active agent(s) as the polymers are degraded.

Actually, any controlled-release agent that could be included in the antifouling article of the embodiments and that can be used to control the release of medetomidine and/or other active agent(s) from the antifouling article could be used according to the embodiments.

In a particular embodiment, the medetomidine and/or the at least one optional biocide other than medetomidine is at least partly bound to the at least one controlled-release agent.

The at least one optional pigment can be selected among pigments traditionally used in connection with polyurethane articles and in particular submersible or underwater products made of polyurethane.

In an embodiment, at least one other biocide other than medetomidine is included in the antifouling agent. This at least one other biocide could be an antifouling agent, an algicide, a fungicide, a herbicide or a combination thereof.

Non-limiting, but illustrative examples of such biocides other than medetomidine that can be used according to the embodiments are listed in WO 2012/175469 on page 11, line 16 to page 12, line 10 and in WO 2013/182641 on page 10, line 22 to page 13, line 2, the teaching of which is hereby incorporated by reference with regard to biocides that can be used according to the embodiments.

Other non-limiting biocides that can be used according to the embodiments include, but are not limited to, chlorothalonil (2,4,5,6-tetrachlorobenzene-1,3-dicarbonitrile), dichlofluanid (N-{[dichloro(fluoro)methyl]sulfanyl}-N',N'-dimethyl-N-phenylsulfuric diamide), DCOIT (4,5-dichloro-2-n-octyl-4-isothiazolin-3-one), cybutryne (2-N-tert-butyl-4-N-cyclopropyl-6-methylsulfanyl-1,3,5-triazine-2,4-diamine), DCMU (3-(3,4-dichlorophenyl)-1,1-dimethylurea), tolylfluanid (N-[dichloro(fluoro)methyl]sulfanyl-N-(dimethylsulfamoyl)-4-methylaniline), zinc pyrithione (bis(2-pyridylthio)zinc 1,1'-dioxide), copper pyrithione (bis(2-pyridylthio)copper 1,1'-dioxide), DCMU (3-(3,4-dichlorophenyl)-1,1-dimethylurea), cybutryne (2-N-tert-butyl-4-N-cyclopropyl-6-methylsulfanyl-1,3,5-triazine-2,4-diamine), dichlofluanid (N-{[dichloro(fluoro)methyl]sulfanyl}-N',N'-dimethyl-N-phenylsulfuric diamide), zinc ethane-1,2-diylbis(dithiocarbamate), zinc bis(dimethylthiocarbamates), dichlofluanid (N-{[dichloro(fluoro)methyl]sulfanyl}-N',N'-dimethyl-N-phenylsulfuric diamide), tolylfluanid (N-[dichloro(fluoro)methyl]sulfanyl-N-(dimethylsulfamoyl)-4-methylaniline), manganese ethylene-1,2-bisdithiocarbamate polymer, DCMU (3-(3,4-dichlorophenyl)-1,1-dimethylurea), cybutryne (2-N-tert-butyl-4-N-cyclopropyl-6-methylsulfanyl-1,3,5-triazine-2,4-diamine), and a mixture thereof.

Medetomidine has specific actions against hard fouling, in particular barnacle cyprids, but typically no effect on algal growth. Accordingly, at least one other biocide, such as an algicide, could be used to prevent algal growth as well.

In an embodiment, the antifouling article is an antifouling coating, an antifouling film or an antifouling paint of an underwater or submersible device or structure. In this embodiment, the antifouling article is applied as a coating, film or paint on the underwater or submersible device or structure. The medetomidine and polyurethane mixture is then preferably applied to the underwater or submersible device or structure in the form of a spray coating, film or paint.

The underwater or submersible device or structure could be a propeller tunnel, a guide vane, a fender, mooring equipment, underwater rope, underwater wire, underwater net, boat hull etc. as illustrative but non-limiting examples.

Sprayable polyurethane elastomers comprising medetomidine according to the embodiments can, as an illustrative, but non-limiting, example, be manufactured based on BAYTEC® TP PU 0308 and DESMODUR® TP PU 0309.

In another embodiment, the polyurethane comprising medetomidine according to the embodiments can be molded or cast into the shape of a part of or consist essentially of an underwater or submersible article. In similar embodiments, polyurethane comprising medetomidine according to the embodiments can be molded or cast into the shape of a cover of underwater or submersible articles. The antifouling article in these embodiments can be manufactured into desired shape in hot or cold casting or molding.

Non-limiting, but illustrative, examples of antifouling articles according to these embodiments include bend stiffeners, bend restrictors, beach bumpers, fenders and mooring equipment. Antifouling articles in the shape of a cover can advantageously be used to prevent fouling of surfaces of guide vanes, various equipment for oil exploration, etc.

A suitable polyurethane article comprising medetomidine can be manufactured based on ELASTURAN® 6005/178.

Thus, an antifouling article according to embodiments could be an antifouling coating, an antifouling film or an antifouling paint that is to be applied onto a submersible device or structure. An antifouling article according to the embodiments could alternatively be in the form of an antifouling underwater or submersible structure or device. In the former case, the antifouling effect is basically achieved by the antifouling coating, film or paint applied to the submersible device or structure. In the latter case, the submersible or underwater device or structure is made of the polyurethane comprising medetomidine and therefore the submersible or underwater device or structure itself has antifouling effect.

Thus, antifouling article denotes any article, product, device or structure, including coatings, films, paints, etc., made of polyurethane and comprising medetomidine as defined herein and thereby having antifouling effect.

As is further disclosed herein, the isocyanate, polyol and medetomidine components are mixed or blended, at which point the polymerization reaction is started. It is possible to apply the polyurethane and medetomidine mixture as spray or fill a mold with the mixture during the working life, typically denoted pot-life, of the mixture and then allow it to cure to form a finished polyurethane product or article.

Sprayable polyurethanes comprising medetomidine typically have shorter pot-life as compared to castable polyurethanes. The spray application can be done in a workshop or on site.

Another aspect of the embodiments relates to a method of producing an antifouling article. The method comprises mixing medetomidine, or an enantiomer or salt thereof, and a solvent to form a medetomidine solution. The method also comprises reacting the medetomidine solution with at least one isocyanate comprising at least two isocyanate groups per molecule and at least one polyol to form polyurethane. The medetomidine, or the enantiomer or salt thereof, is present in a polymer matrix of the polyurethane. The method further comprises forming the polyurethane into the antifouling article. The medetomidine, or the enantiomer or salt thereof, is present in at least 0.1% by weight of the antifouling article.

In an embodiment, the solvent is selected from a group consisting of a diol, a polyol, a diamine, a polymamine, and a mixture thereof; preferably a group consisting of a diol, a diamine, and a mixture thereof; and more preferably a diol, and in particular 1,4-butanediol.

In an embodiment, the solvent is used as a chain extender and/or cross-linker in reacting the medetomidine solution with the at least one isocyanate and the at least one polyol.

In a particular embodiment, the method comprising dissolving medetomidine in the solvent, such as 1,4-butanediol, to form the medetomidine solution. The medetomidine solution is preferably first mixed or blended with the polyol to form a medetomidine and polyol mixture. This medetomidine and polyol mixture is then preferably mixed or blended with the isocyanate.

In an embodiment, mixing medetomidine, or the enantiomer or salt thereof, and the solvent, such as 1,4-butanediol, comprises dissolving medetomidine, or the enantiomer or salt thereof, in the solvent, such as 1,4-butanediol, to form the medetomidine solution comprising medetomidine, or the enantiomer or salt thereof, from 0.1 up to 20% by weight of the medetomidine solution, preferably 5 up to 20% by weight of the medetomidine solution, and more preferably 10 up to 20% by weight of the medetomidine solution.

In an embodiment, reacting the medetomidine solution comprises reacting the medetomidine solution with MDI and at least one polyol to form polyurethane.

In a particular embodiment, if any further additives, such as chain extenders, cross linkers, pigments, drying agents, etc., and/or active agents other than medetomidine, such as other biocide agents, are used these can be added to the medetomidine solution, added to the polyol, or added to the mixture of the polyol and the medetomidine solution.

In a particular embodiment, reacting the medetomidine solution comprises reacting the medetomidine solution with MDI and at least one polyether polyol, at least one polyester polyol or a mixture of at least one polyether polyol and at least one polyether polyol.

In an embodiment, forming the polyurethane into the antifouling article comprises spraying a mixture of the medetomidine solution, the at least one isocyanate and the at least one polyol onto surface to form a coating, a film or a paint. This embodiment also comprises curing the coating, the film or the paint on the surface to form the antifouling article.

In another embodiment, forming the polyurethane into the antifouling article comprises molding or casting a mixture of the medetomidine solution, the at least one isocyanate and the at least one polyol in a mold. This embodiment also comprises curing the mixture in the mold to form the antifouling article.

A further aspect of the embodiments relates to a kit for producing an antifouling article. The kit consists of at least one polyol, at least one isocyanate comprising at least two isocyanate groups per molecule, a solvent, medetomidine, or an enantiomer or salt thereof, in an amount sufficient to achieve a concentration of medetomidine, or the enantiomer or salt thereof, of at least 0.1% by weight of the antifouling agent, optionally a catalyst, optionally at least one chain extender and/or cross linker, optionally at least one drying agent, optionally at least one pigment, optionally at least one biocide other than medetomidine, or the enantiomer or salt thereof, and optionally at least controlled-release agent.

In an embodiment, the solvent is selected from a group consisting of a diol, a polyol, a diamine, a polyamine, and a mixture thereof, preferably a group consisting of a diol, a diamine, and a mixture thereof, and more preferably diol, and in particular 1,4-butanediol.

In an embodiment, the solvent is a chain extender and/or a cross-linker.

In an embodiment, the at least one isocyanate is methylene diphenyl diisocyante (MDI).

In an embodiment, the at least one polyol is at least one polyether polyol, at least one polyester polyol or a mixture of at least one polyether polyol and at least one polyester polyol.

In an embodiment, the kit comprises medetomidine, or the enantiomer or thereof, and the solvent, such as 1,4-butanediol, in amounts sufficient to form a medetomidine solution comprising medetomidine, or the enantiomer or salt thereof, and the solvent, such as 1,4-butanediol, with medetomidine, or the enantiomer or salt thereof, from 0.1 up to 20% by weight of the medetomidine solution, preferably 5 up to 20% by weight of the medetomidine solution, and more preferably 10 up to 20% by weight of the medetomidine solution.

In an embodiment, the at least one optional controlled-release agent is nanoparticles made of a metal oxide, preferably titanium(II) oxide, copper(II) oxide, cuprous(I) oxide, or zinc(II) oxide.

In an embodiment, medetomidine, or the enantiomer or salt thereof and/or the at least one optional biocide other than medetomidine, or the enantiomer or salt thereof, is at least partly bound to the at least one controlled-release agent.

EXAMPLES

Example 1

This example investigated the solubility of SELEKTOPE® (I-Tech AB, Mölndal, Sweden) in 1,4-butandiol (Brenntag Nordic AB, Malmö, Sweden). Vials were prepared according to Table 1 and left with stirring.

TABLE 1 vials with mixtures of 1,4-butandiol and SELEKTOPE ®

| Vial number | 1,4-butandiol (g) | SELEKTOPE ® (mg) |
|---|---|---|
| 1 | 1.007 | 97 |
| 2 | 1.012 | 206 |
| 3 | 1.024 | 303 |
| 4 | 1.009 | 247 |

After about 2 hours most of the SELEKTOPE® material had dissolved in vial numbers 1 and 2. In vial number 3 there were still a lot of non-dissolved SELEKTOPE®. After 24 hours all SELEKTOPE® had dissolved in vial number 1 and only a few SELEKTROPE® grains remained in vial number 2. There was no major difference in vial number 3 24 hours after preparation as compared to after 2 hours. 48 hours after preparation, all SELEKTOPE® material had dissolved in vial numbers 1 and 2. Vial number 3 looked the same as after 2 hours and after 24 hours.

Vial number 4 was prepared and left with stirring in a same way as vial numbers 1-3. 24 hours after preparation most of the SELEKTOPE® material had dissolved but there were a few non-dissolved grains remaining. The results were the same 48 hours preparation.

It was concluded that the solubility of SELEKTOPE® in 1,4-butandiol was about 250 mg SELEKTOPE® per g of 1,4-butandiol.

Example 2

This experiment produced and tested SELEKTOPE® containing polyurethane sheets made based on ELASTURAN® 6005/178 (BASF Polyurethanes GmbH, Germany). ELASTURAN® 6005/178 results in a semi-rigid flexible cast polyurethane elastomer with excellent mechanical properties. ELASTURAN® 6005/178 may, for example, be used as protection on cables placed on the bottom of the sea, sealing material on ships, vibration-damping in submersible pumps, etc.

In this experiment, four solutions of SELEKTOPE® (I-Tech AB, Mölndal, Sweden) in 1,4-butandiol (Brenntag Nordic AB, Malmö, Sweden) were prepared according to Table 2.

TABLE 2

Solutions of SELEKTOPE ® in 1,4-butandiol

| Solution number | 1,4-butandiol (g) | SELEKTOPE ® (g) |
|---|---|---|
| 1 | 127.982 | 2.077 |
| 2 | 127.608 | 4.030 |
| 3 | 128.655 | 11.121 |
| 4 | 128.756 | 22.123 |

The solutions were used in the preparation of four polyurethane test sheets (sheet numbers 1-4). A reference polyurethane sheet (sheet number 0) was also prepared without any SELECTOPE®.

The following recipe was used to prepare the polyurethane test sheets. 90 parts by weight of ELASTURAN® 6005/178 A-component, i.e., polyol-component (preparation based on polyether polyol, catalyst, stabilizing agent, additives), was mixed with 10 parts by weight of the SELEKTOPE® solution in Table 2 for sheet numbers 1-4. 100 parts by weight of the resulting polyol and SELEKTOPE® mixture was mixed with 40 parts by weight of ELASTURAN® 6005/178 B-component, i.e., isocyanate component (preparation based on MDI).

Table 3 below indicates the weight percentage of SELEKTOPE in the four test sheets.

TABLE 3

Polyurethane test sheets

| Sheet number | Solution number | Weight % of SELEKTOPE ® |
|---|---|---|
| 1 | 1 | 0.1 |
| 2 | 2 | 0.2 |
| 3 | 3 | 0.5 |
| 4 | 4 | 1 |

Each test sheet was divided into three panels, of which two, denoted a and b herein, were used in a field test and one panel was kept as non-exposed reference.

The ten panels (1a, 1b; 2a, 2b; 3a, 3b; 4a, 4b; 0a, 0b) were placed in aluminum frames and submersed underwater at Tjärnö marine station on the Swedish west coast on May 29, 2013. The panels were monitored by regular visits and photographed at each visit.

Inspection Sep. 2, 2013

The aluminum frames were so heavily covered with tunicates that the tunicates had to be removed in water before it was possible to lift the frames out of the water. The reference panels (0a, 0b) were more or less covered by tunicates. There were fewer tunicates on panels 2b, 3b, 4a and 4b. There were no barnacles on the eight test panels of the present invention 1a, 1b-4a, 4b. There were both barnacles and bryozoans on reference panels 0a, 0b.

Inspection Nov. 5, 2013

The ten panels were more or less covered by tunicates. These tunicates were removed. There were no barnacles on the test panels of the present invention. There were both barnacles and bryozoans on reference panels 0a, 0b.

Inspection Apr. 9, 2014

The test panels of the present invention were free from barnacles. The reference panels 0a, 0b were more or less covered with barnacles. All of these barnacles were adults. Most of the panels where covered with lots of slime and hydroids but this was easy to remove by just dragging a finger over them or light rinsing. FIG. 1 illustrates the reference panel 0b to left, the test panel 1b in the middle and the test panel 4b to the right.

Inspection Sep. 1, 2014

The test panels of the present invention were free from barnacles. The reference panels 0a, 0b had a lot of adult barnacles on them. All panels were covered with tunicates that was removed at the inspection in order to see what was underneath. Most of the panels also had slime and hydroids but this was easy to remove by sweeping with a hand over them.

Final Inspection May 21, 2015

The polyurethane panels were all fouled but only reference panels 0a, 0a had a lot of barnacles. The test panels 1a, 1b had a few barnacles, whereas no barnacles was present on the test panels 2a, 2b, 3a, 3b, 4a, 4b.

Thus, polyurethane panels and sheets of the present invention comprising at least 0.1% by weight of SELEKTOPE® lead to significantly less barnacles as compared to reference polyurethane panels and sheets, which were covered by barnacles.

Example 3

A 15% by weight SELEKTOPE® solution in 1,4-butandiol was prepared by dissolving 150 g SELEKTOPE® (I-Tech AB, Mölndal, Sweden) in 1,4-butanediol (Brenntag Nordic AB, Malmö, Sweden) to form 1000 g of the SELEKTOPE® solution. 250 g of the SELEKTOPE® solution was mixed with 5000 g of BAYTEC® TP PU 0308, which is a polyol mixture comprising diamines, such as diethyltoluenediamine. The resulting 5250 g mixture was then mixed with 4987 g of DESMODUR® TP PU 0309, which is an isocyanate component comprising MDI.

The resulting mixture contained 0.37% SELEKTOPE® by weight. The mixture was poured out on a flat surface and cured into a sheet, from which two test pieces, A and B, were cut out.

The test pieces were mounted in an aluminum frame and was submerged underwater at Tjärnö marine station on the Swedish west coast on Oct. 27, 2015.

Inspection Apr. 19, 2016

Some small barnacles were found on test piece A. There were no barnacles on test piece B. The aluminum frame was covered with small barnacles.

Inspection Jun. 2, 2016

Figure 2A:
FIGS. 2A and 2B illustrate polyurethane panels comprising 0.37% medetomidine by weight after 44 days of submersion underwater. No barnacles are found on the polyurethane panels, whereas the aluminum frame is covered by barnacles.
Figure 2B:

There were no barnacles on any of the panels A and B but plenty of adult barnacles on the aluminum frame, see FIGS. 2A and 2B.

Inspection Jul. 2, 2016

There were no barnacles on any of the test panels A and B. The test panels were covered with tunicates that were removed before the test panels were submerged again.

Inspection Sep. 20, 2016

There were no barnacles on any of the test panels A and B. The test panels were covered with tunicates that were removed before the test panels were submerged again.

Inspection Oct. 26, 2016

There were no barnacles on any of the test panels A and B, only slime and hydroids.

Polyurethane panels of the present invention comprising 0.37% by weight of SELEKTOPE® was effective in preventing adhesion and growth of barnacles.

Example 4

Contact angle is the angle where a liquid interface meets a solid surface. It quantifies the wettability of a solid surface by a liquid. Generally, if the water contact angle is smaller than 90°, the solid surface is considered hydrophilic and if the water contact angle is larger than 90°, the solid surface is considered hydrophobic.

In this example, four polyurethane test sheets as produced according to Example 2 (denoted sample 1 to 4 herein in line with the denotation in Example 2) together with a polyurethane test sheet lacking SELEKTOPE® (denoted sample 0 herein) were used.

All samples were wiped with 2-propanol 24 hours before the start of the measurements. For each sample, six drops were evaluated. For each drop, eleven consecutive measurements were performed with 1 s between each measurement. The first measurement of the eleven consecutive measurements were made within 0.5-1 s from the time the water touched the sample.

The results from the contact measurements are presented in Table 4, in which the average contact angle for the eleven measurements are presented for each sample and each of the six drops, and in Table 5, in which the average contact angle of the first and elevenths measurements among the six droplets are presented.

TABLE 4 average contact angle per drop

| Sample | Drop no. 1 | 2 | 3 | 4 | 5 | 6 |
|---|---|---|---|---|---|---|
| 0 | 101.3 ± 1.2° | 95.8 ± 1.2° | 99.5 ± 1.8° | 97.2 ± 2.6° | 99.5 ± 1.0° | 98.7 ± 1.7° |
| 1 | 109.7 ± 0.2° | 108.7 ± 0.4° | 109.1 ± 0.4° | 108.3 ± 1.9° | 106.2 ± 1.8° | 103.8 ± 0.9° |
| 2 | 110.4 ± 3.6° | 121.1 ± 0.3° | 112.8 ± 2.6° | 103.7 ± 4.1° | 105.0 ± 3.8° | 99.6 ± 4.4° |
| 3 | 94.5 ± 2.9° | 99.3 ± 2.6° | 97.7 ± 3.3° | 98.3 ± 2.4° | 92.6 ± 2.5° | 97.0 ± 2.9° |
| 4 | 110.8 ± 0.4° | 110.3 ± 0.8° | 109.5 ± 1.1° | 107.3 ± 0.8° | 107.3 ± 1.3° | 108.4 ± 1.1° |

TABLE 5 average contact angles for first and last measurements

| Sample | $1^{st}$ measurement | $11^{th}$ measurement |
|---|---|---|
| 0 | 102 ± 1.9° | 97 ± 2.3° |
| 1 | 109 ± 2.0° | 107 ± 2.8° |
| 2 | 115 ± 4.7° | 105 ± 9.2° |
| 3 | 103 ± 2.7° | 94 ± 2.5° |
| 4 | 110 ± 1.1° | 108 ± 1.9° |

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] US 2014/0141263
[2] GB 1 307 001
[3] U.S. Pat. No. 3,702,778
[4] ASTM D5618-94(2011), Standard Test Method for Measurement of Barnacle Adhesion Strength in Shear
[5] Lewthwaite et al., "An Investigation into the variation of ship skin fictional resistance with fouling", *Annual report and transactions of the Royal Institution of Naval Architects,* 127: 269-284, 1984
[6] Swain, "Redefining antifouling coatings", *Journal of Protective Coatings and Linings,* 26-35, September 1999
[7] US 2014/0247690
[8] EP 0 072 615

[9] MacDonald et al., "Comparison of the behavioral and neurochemical effects of the 2 optical enantiomers of medetomidine, a selective alpha2-adrenoreceptor agonist", *Journal of pharmacology and experimental therapeutics*, 259: 848-854, 1991

[10] Savola and Virtanen, "Central 2-adrenoceptors are highly stereoselective for dexmedetomidine, the dextroenantiomer of medetomidine", *European Journal of Pharmacology*, 195:193-199, 1991

[11] WO 2011/070069

[12] US 2006/0201379

[13] WO 2007/007901

The invention claimed is:

1. An antifouling article comprising:
   polyurethane; and
   medetomidine, or an enantiomer or salt thereof, from 0.1% by weight of said antifouling article and present in a polymer matrix of said polyurethane,
   wherein said anifouling article is obtainable by:
   mixing medetomidine, or said enantiomer or salt thereof, and solvent to form a medetomidine solution;
   reacting said medetomidine solution with at least one isocyanate comprising at least two isocyanate groups per molecule and at least one polyol to form polyurethane, wherein said medetomidine, or said enantiomer or salt thereof, is present in said polymer matrix; and
   forming said polyurethane into said antifouling article, wherein said medetomidine, or said enantiomer or salt thereof, is present in at least 0.1% by weight of said antifouling article.

2. The antifouling article according to claim 1, wherein mixing medetomidine, or said enantiomer or salt thereof, and said solvent comprises mixing medetomidine, or said enantiomer or salt thereof, and a solvent selected from a group consisting of a diol, a polyol, a diamine, a polyamine, and a mixture thereof.

3. The antifouling article according to claim 1, wherein mixing medetomidine, or said enantiomer or salt thereof, and said solvent comprises mixing medetomidine, or said enantiomer or salt thereof, and a solvent used as a chain extender and/or a cross-linker in reacting said medetomidine solution with said at least one isocyanate and said at least one polyol.

4. The antifouling article according to claim 1, wherein mixing medetomidine, or said enantiomer or salt thereof, and said solvent comprises dissolving medetomidine, or said enantiomer or salt thereof, in said solvent to form said medetomidine solution comprising medetomidine, or said enantiomer or salt thereof, from 0.1 up to 20% by weight of said medetomidine solution.

5. The antifouling article according to claim 1, wherein reacting said medetomidine solution comprises reacting said medetomidine solution with methylene diphenyl diisocyante (MDI) and at least one polyol to form polyurethane.

6. The antifouling article according to claim 5, wherein reacting said medetomidine solution comprises reacting said medetomidine solution with MDI and at least one polyether polyol, at least one polyester polyol or a mixture of at least one polyether polyol and at least one polyester polyol.

7. The antifouling article according to claim 1, comprising medetomidine, or said enantiomer or salt thereof, from 0.1 up to 2% by weight of said antifouling article.

8. The antifouling article according to claim 1, wherein said antifouling article consists of:
   polyurethane;
   medetomidine, or said enantiomer or salt thereof, from 0.1% by weight of said antifouling article and present in said polymer matrix;
   optionally at least one pigment;
   optionally at least one biocide other than medetomidine, or said enantiomer or salt thereof; and
   optionally at least one controlled-release agent,
   wherein medetomidine, or said enantiomer or salt thereof and/or said at least one optional biocide other than medetomidine, or said enantiomer or salt thereof, is optionally at least partly bound to said at least one controlled-release agent.

9. The antifouling article according to claim 1, wherein said antifouling article is selected from a group consisting of an antifouling coating, an antifouling film and an antifouling paint.

10. The antifouling article according to claim 9, wherein said antifouling article is an antifouling coating, an antifouling film or an antifouling paint of an underwater or submersible device or structure selected from a group consisting of a propeller tunnel, a guide vane, a fender, a boat hull, mooring equipment, underwater rope, underwater wire and underwater net.

11. The antifouling article according to claim 1, wherein said antifouling article is selected from a group consisting of a bend stiffener, a bend restrictor, a beach bumper, a fender, and mooring equipment.

12. A method of producing an antifouling article comprising:
    mixing medetomidine, or an enantiomer or salt thereof, and a solvent to form a medetomidine solution;
    reacting said medetomidine solution with at least one isocyanate comprising at least two isocyanate groups per molecule and at least one polyol to form polyurethane, wherein said medetomidine, or said enantiomer or salt thereof, is present in a polymer matrix of said polyurethane; and
    forming said polyurethane into said antifouling article, wherein said medetomidine, or said enantiomer or salt thereof, is present in at least 0.1% by weight of said antifouling article.

13. The method according to claim 12, wherein forming said polyurethane into said antifouling article comprises:
    spraying a mixture of said medetomidine solution, said at least one isocyanate and said at least one polyol onto a surface to form a coating, a film or a paint; and
    curing said coating, said film or said paint on said surface to form said antifouling article.

14. The method according to claim 12, wherein forming said polyurethane into said antifouling article comprises:
    molding or casting a mixture of said medetomidine solution, said at least one isocyanate and said at least one polyol in a mold; and
    curing said mixture in said mold to form said antifouling article.

15. A kit for producing an antifouling article, said kit consisting of:
    at least one polyol;
    at least one isocyanate comprising at least two isocyanate groups per molecule;
    a solvent;
    medetomidine, or an enantiomer or salt thereof, in an amount sufficient to achieve a concentration of medetomidine of at least 0.1% by weight of said antifouling article;
    optionally a catalyst;
    optionally at least one chain extender and/or cross linker;

optionally at least one drying agent;
optionally at least one pigment;
optionally at least one biocide other than medetomidine, or said enantiomer or salt thereof; and
optionally at least one controlled-release agent.

16. The kit according to claim 15, wherein said solvent is selected from a group consisting of a diol, a polyol, a diamine, a polyamine, and a mixture thereof.

17. The kit according to claim 15, wherein said at least one isocyanate is methylene diphenyl diisocyante (MDI).

18. The kit according to claim 15, wherein said at least one polyol is at least one polyether polyol, at least one polyester polyol or a mixture of at least one polyether polyol and at least one polyester polyol.

19. The kit according to claim 15, comprising medetomidine, or said enantiomer or salt thereof, and said solvent in amounts sufficient to form a medetomidine solution comprising medetomidine, or said enantiomer or salt thereof, and said solvent with medetomidine, or said enantiomer or salt thereof, from 0.1 up to 20% by weight of said medetomidine solution.

20. The kit according to claim 15, wherein the kit further comprises said at least one controlled-release agent and said at least one controlled-release agent is nanoparticles comprising a metal oxide.

* * * * *

UNITED STATES PATENT AND TRADEMARK OFFICE
CERTIFICATE OF CORRECTION

PATENT NO. : 11,603,475 B2
APPLICATION NO. : 16/497213
DATED : March 14, 2023
INVENTOR(S) : Isaksson et al.

It is certified that error appears in the above-identified patent and that said Letters Patent is hereby corrected as shown below:

In the Specification

Column 8, Line 31: Please correct "(f 3)" to read --($f \geq 3$)--

Signed and Sealed this
Eighteenth Day of July, 2023

Katherine Kelly Vidal
*Director of the United States Patent and Trademark Office*